United States Patent
Luttwak et al.

(10) Patent No.: US 12,380,223 B1
(45) Date of Patent: Aug. 5, 2025

(54) TECHNIQUES FOR RISK AND CONSTRAINT-BASED INSPECTION

(71) Applicant: Wiz, Inc., New York, NY (US)

(72) Inventors: Ami Luttwak, Binyamina (IL); Yaniv Shaked, Tel Aviv (IL); Shahar Rand, Haifa (IL); Eric Abramov, Holon (IL); Elad Gabay, Tel Aviv (IL); Yinon Costica, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/000,872

(22) Filed: Dec. 24, 2024

(51) Int. Cl.
*G06F 21/57* (2013.01)
*G06F 9/50* (2006.01)

(52) U.S. Cl.
CPC .............. *G06F 21/577* (2013.01); *G06F 9/50* (2013.01)

(58) Field of Classification Search
CPC .................................. G06F 21/577; G06F 9/50
See application file for complete search history.

(56) References Cited

U.S. PATENT DOCUMENTS

| | | | |
|---|---|---|---|
| 9,628,501 B2 | 4/2017 | Datta Ray et al. | |
| 10,095,545 B1 * | 10/2018 | Gupta | G06F 9/4881 |
| 10,200,411 B1 * | 2/2019 | Pigoski, II | G06F 9/45533 |
| 10,628,228 B1 * | 4/2020 | Theunissen | G06F 9/505 |
| 10,917,401 B1 * | 2/2021 | Mantin | H04L 63/1441 |
| 11,031,135 B2 | 6/2021 | Gates et al. | |
| 11,089,055 B1 * | 8/2021 | Sadovyi | G06Q 20/085 |
| 11,516,222 B1 * | 11/2022 | Srinivasan | G06F 21/577 |
| 11,677,791 B1 * | 6/2023 | Dunkel | H04L 63/205 |
| | | | 726/1 |
| 11,750,642 B1 | 9/2023 | Tautschnig et al. | |
| 11,809,575 B1 * | 11/2023 | Reddy | G06F 21/577 |
| 11,962,622 B2 | 4/2024 | Kung et al. | |
| 12,132,735 B1 * | 10/2024 | Razavi | H04L 63/10 |
| 2020/0380160 A1 | 12/2020 | Kraus et al. | |
| 2022/0261482 A1 * | 8/2022 | Hasegawa | G06F 21/577 |
| 2023/0222222 A1 * | 7/2023 | Pagnozzi | G06F 8/65 |
| | | | 726/22 |
| 2023/0379346 A1 * | 11/2023 | Goldstein | G06F 21/554 |

* cited by examiner

*Primary Examiner* — Darren B Schwartz
(74) *Attorney, Agent, or Firm* — M&B IP Analysts, LLC (57) ABSTRACT

A system and method for risk and constraint-based cybersecurity inspection of a computing environment is presented. The method includes querying an application programming interface (API) of a computing environment to detect a plurality of workloads deployed therein; determining a constraint for inspection of the computing environment; provisioning resources of the computing environment to an inspection account based on the determined constraint; and initiating inspection of the plurality of workloads utilizing the provisioned resources.

25 Claims, 7 Drawing Sheets

TECHNIQUES FOR RISK AND CONSTRAINT-BASED INSPECTION

TECHNICAL FIELD

The present disclosure relates generally to the field of cybersecurity, and more specifically to risk and constraint-based cybersecurity inspection.

BACKGROUND

Scanning a computing environment for cybersecurity threats presents significant challenges due to the complexity, scale, and dynamic nature of modern IT infrastructures. Organizations often operate in hybrid environments that combine on-premises systems, cloud services, and distributed networks, making it difficult to maintain visibility across all assets. The diversity of devices, operating systems, and applications further complicates the process, as each may have unique vulnerabilities requiring specific scanning techniques.

Another challenge lies in balancing thoroughness and performance. Comprehensive scans can strain system resources, leading to degraded performance or downtime, which is particularly problematic for critical systems. Conversely, less intrusive scans may miss subtle or deeply embedded threats, leaving vulnerabilities undetected.

Additionally, the sheer volume of data generated by scans poses difficulties in analysis and prioritization. Security teams must sift through vast numbers of alerts to identify true threats, often dealing with false positives or incomplete information. This can lead to alert fatigue and delayed responses to genuine risks.

Evolving threats add another layer of complexity. Cybercriminals continuously develop new attack methods, including advanced persistent threats (APTs) and zero-day exploits, which can evade traditional scanning techniques. Ensuring that scanning tools remain effective against these emerging threats is a constant challenge for organizations.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include querying an application programming interface (API) of a computing environment to detect a plurality of workloads deployed therein. The method may also include determining a constraint for inspection of the computing environment. The method may furthermore include provisioning resources of the computing environment to an inspection account based on the determined constraint. The method may in addition include initiating inspection of the plurality of workloads utilizing the provisioned resources. Other embodiments of this aspect include corresponding computer systems, apparatus, and computer programs recorded on one or more computer storage devices, each configured to perform the actions of the methods.

Implementations may include one or more of the following features. The method may include: detecting a cybersecurity risk in the computing environment; and adjusting the provisioned resources based on the detected cybersecurity risk. The method where detecting a cybersecurity risk further may include: inspecting a workload of the plurality of workloads for a cybersecurity object; and detecting the cybersecurity object on the workload, where the cybersecurity object indicates a cybersecurity risk. The method may include: initiating inspection of a cloud entity of a control plane of the computing environment. The method may include: initiating inspection of a cloud entity of a data plane of the computing environment. The method where determining a constraint further may include: determining for each workload of the plurality of workloads a resource utilization; and determining a resource utilization of an inspector workload. The method may include: detecting a cybersecurity object on a first workload of the plurality of workloads, the cybersecurity object indicating a cybersecurity issue; selecting a periodic time for inspection based on the cybersecurity issue, where the periodic time is the determined constraint; and initiating inspection of the first workload periodically based on the selected periodic time. The method may include: provisioning, based at least on the determined constraint, a network bandwidth between the computing environment and an inspection environment. The method may include: receiving a result of the initiating inspection from the an inspector workload; and generating a representation based on the result in a security database, where the security database includes a representation of the computing environment. The method may include: detecting a code object utilized to deploy a first workload of the plurality of workloads in the a cloud computing environment; and determining a resource utilization of the first workload based on a static analysis of the code object. The method may include: deprovisioning a resource provisioned to the inspection account in response to determining that the resource is not utilized during inspection. The method may include: receiving a resource constraint, the resource constraint indicating a limit on resource utilization of the computing environment; and provisioning resources for inspection further based on the received resource constraint. Implementations of the described techniques may include hardware, a method or process, or a computer tangible medium.

In one general aspect, non-transitory computer-readable medium may include one or more instructions that, when executed by one or more processors of a device, cause the device to: query an application programming interface (API) of a computing environment to detect a plurality of workloads deployed therein; determine a constraint for inspection of the computing environment; provision resources of the computing environment to an inspection account based on the determined constraint; and initiate inspection of the plurality of workloads utilizing the provisioned resources. Other embodiments of this aspect include corresponding computer systems, apparatus, and computer programs recorded on one or more computer storage devices, each configured to perform the actions of the methods.

In one general aspect, a system may include one or more processors configured to: query an application programming interface (API) of a computing environment to detect a plurality of workloads deployed therein. The system may furthermore determine a constraint for inspection of the computing environment. The system may in addition provision resources of the computing environment to an inspection account based on the determined constraint. The system may moreover initiate inspection of the plurality of workloads utilizing the provisioned resources. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: detect a cybersecurity risk in the computing environment; and adjust the provisioned resources based on the detected cybersecurity risk. The system where the one or more processors, when detecting a cybersecurity risk, are configured to: inspect a workload of the plurality of workloads for a cybersecurity object; and detect the cybersecurity object on the workload, where the cybersecurity object indicates a cybersecurity risk. The system where the one or more processors are further configured to: initiate inspection of a cloud entity of a control plane of the computing environment. The system where the one or more processors are further configured to: initiate inspection of a cloud entity of a data plane of the computing environment. The system where the one or more processors, when determining a constraint, are configured to: determine for each workload of the plurality of workloads a resource utilization; and determine a resource utilization of an inspector workload. The system where the one or more processors are further configured to: detect a cybersecurity object on a first workload of the plurality of workloads, the cybersecurity object indicating a cybersecurity issue; select a periodic time for inspection based on the cybersecurity issue, where the periodic time is the determined constraint; and initiate inspection of the first workload periodically based on the selected periodic time. The system where the one or more processors are further configured to: provision, based at least on the determined constraint, a network bandwidth between the computing environment and an inspection environment. The system where the one or more processors are further configured to: receive a result of the initiating inspection from the an inspector workload; and generate a representation based on the result in a security database, where the security database includes a representation of the computing environment. The system where the one or more processors are further configured to: detect a code object utilized to deploy a first workload of the plurality of workloads in the a cloud computing environment; and determine a resource utilization of the first workload based on a static analysis of the code object. The system where the one or more processors are further configured to: deprovision a resource provisioned to the inspection account in response to determining that the resource is not utilized during inspection. The system where the one or more processors are further configured to: receive a resource constraint, the resource constraint indicating a limit on resource utilization of the computing environment; and provision resources for inspection further based on the received resource constraint. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1:
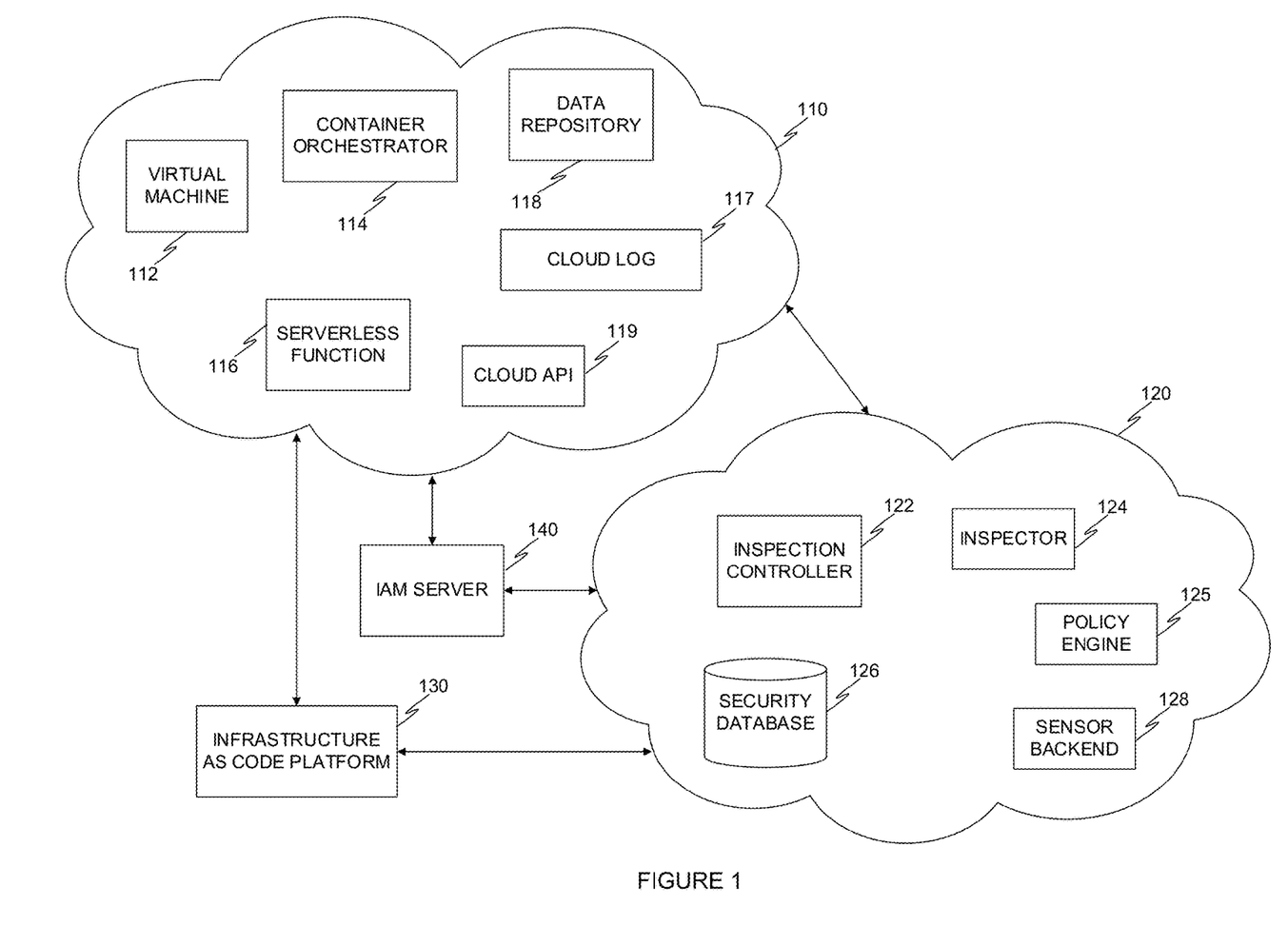
FIG. 1 is an example schematic diagram of a cloud computing environment monitored for a cybersecurity threat by an inspection environment, implemented in accordance with an embodiment.

FIG. 1 is an example schematic diagram of a cloud computing environment monitored for a cybersecurity threat by an inspection environment, implemented in accordance with an embodiment. In an embodiment, a cloud computing environment 110 is implemented as a virtual private cloud (VPC), Virtual Network (VNet), virtual private network (VPN) and the like, over a cloud computing platform. A cloud computing platform may be provided, for example, by Amazon® Web Services (AWS), Google® Cloud Platform (GCP), Microsoft® Azure, and the like.

In an embodiment, a cloud computing environment 110 includes cloud entities deployed therein. According to an embodiment, a cloud entity is, for example, a principal, a resource, a combination thereof, and the like. In an embodiment, a resource is a cloud entity which provides access to a compute resource, such as a processor, a memory, a storage, and the like.

In some embodiments a resource is a virtual machine, a software container, a serverless function, and the like.

According to certain embodiments, a resource includes a software application deployed thereon, such as a webserver, a gateway, a load balancer, a web application firewall (WAF), an appliance, various combinations thereof, and the like.

In certain embodiments, a principal is a cloud entity which is authorized to initiate actions in the cloud computing environment. According to some embodiments, a cloud entity is, for example, a user account, a service account, a role, and the like. In some embodiments, a cloud entity is a principal relative to another cloud entity, and a resource to other cloud entities. For example, a load balancer is a resource to a user account requesting a webpage from a webserver behind the load balancer, and the load balancer is a principal to the webserver.

The cloud computing environment 110 includes a plurality of resources, such as virtual machine 112, software container orchestrator 114, and serverless function 116. A virtual machine 112 may be deployed, for example, utilizing Oracle® VirtualBox®. A software container orchestrator 114 may be deployed, for example, utilizing a Docker® engine, a Kubernetes® engine, and the like. In an embodiment, a software container orchestrator 114 is configured to deploy a software cluster, each cluster including a plurality of nodes. In an embodiment, a node includes a plurality of pods. A serverless function 116, may be, for example, utilized with Amazon® Lambda. In an embodiment, the serverless function 116 is a serverless function container image.

In an embodiment, the cloud computing environment 110 includes a data repository 118. According to an embodiment, the data repository 118 includes a code object, a software image, a software library, a software binary, and the like. In an embodiment, a workload, a resource, and the like, are deployed in the cloud computing environment 110 based on a code object, software image, and the like, which is accessed from the data repository 118.

In some embodiments, the cloud computing environment 110 includes a cloud application programming interface (API). In certain embodiments, the cloud API 119 is utilized to access resources of the cloud computing environment 110. For example, in an embodiment, a resource is configured to generate an API call. In an embodiment, a process deployed on a virtual machine 112 initiates an API call, from example to the cloud API 119.

In certain embodiments, the cloud computing environment 110 is configured to utilize an identity and access management (IAM) server 140. In some embodiments, the IAM server 140 is configured to manage identities of the cloud computing environment 110. In an embodiment, the IAM server 140 is configured to associate a cloud identity, such as a user account, a service account, a role, a user group, a combination thereof, and the like, with a permission, an authorization, a combination thereof, and the like.

According to an embodiment, the cloud computing environment 110 is connected to an infrastructure as code (IaC) platform 130. In an embodiment, an IaC platform 130 utilizes, for example, Terraform®. In certain embodiments, a workload is deployed in the cloud computing environment 110 based on a code object from the IaC platform 130.

In some embodiments, a code object includes a code instruction utilized to assume a role, call a role, initiate an action in a computing environment, a combination thereof, and the like.

In certain embodiments, workloads, processes deployed on workloads, principals, and the like, generate actions, events, and the like, in the cloud computing environment 110. In some embodiments, a cloud log system 117 is configured to generate a log event based on an action, an event, a combination thereof, and the like.

For example, in an embodiment, a serverless function 116 is configured to initiate an action utilizing the cloud API 119. In certain embodiments, the cloud log system 117 is configured to generate a data record (e.g., a log event) in a cloud log including data describing the initiated action. In some embodiments, the data record includes an identifier of the serverless function, an IP address, an identifier of the API call, a combination thereof, and the like.

According to an embodiment, the cloud computing environment 110 includes a plurality of resources as discussed in more detail herein. Each such resource is susceptible to various cybersecurity threats. Such threats can become apparent for example due to a software version of an application in a software container 114, an operating system (OS) version of a virtual machine 112, a misconfiguration in code of a serverless function 116, and the like. In an embodiment, the cloud computing environment 110 is monitored for cybersecurity threats by an inspection environment 120. In an embodiment, the inspection environment is implemented as a cloud computing environment, including a VPC, VNet, VPN, and the like.

In an embodiment, each of the virtual machine 112, the software container 114, and the serverless function 116 include a sensor configured to a particular resource, resource type, combination thereof, and the like. An example deployment of a sensor is discussed in more detail in FIG. 2 below.

In an embodiment, the sensor (not shown in FIG. 1) is configured to listen for events, packets, and the like, on a data link layer. In some embodiments, the sensor is configured to detect run-time events, running processes, and the like, on the resource on which the sensor is deployed.

For example, according to an embodiment, the sensor is configured to utilize an eBPF interface, which allows non-intrusive monitoring of the data link layer communication. In certain embodiments, the sensor is further configured to send data to and receive data from a sensor backend server 128. The sensor backend server 128 is a workload, such as a virtual machine, software container, serverless function, combination thereof, and the like, which is deployed in the inspection environment 120.

In an embodiment, the sensor backend server 128 is configured to receive sensor generated data. For example, the sensor backend server 128 is configured, in an embodiment, to receive events from a sensor.

In some embodiments, the sensor is configured to request from the sensor backend server 128 rules, definitions, and the like, which the sensor is configured to apply to events, for example as detected on an eBPF interface. For example, a predetermined event, such as indicating access to an IP address, IP address range, and the like, may be checked against a definition.

According to certain embodiments, a definition is a logical expression which, when applied to an event, yields a "true" or "false" result. In an embodiment, a rule is a logical expression which includes an action. For example, a rule may be that if a certain definition is true when applied to an event, data pertaining to the event should be sent to the sensor backend server 128.

In some embodiments, the sensor backend server 128 is configured to initiate inspection of a resource deployed in the cloud computing environment 110. For example, the sensor backend server 128 may be configured to initiate such inspection in response to receiving an event, data, a combination thereof, and the like, from a sensor deployed on a resource.

In an embodiment, initiating inspection of a resource is performed by generating an instruction for an inspection controller 122, the instruction, when executed, configures an inspector 124 to inspect the resource.

For example, a sensor is configured to send event data to the sensor backend server 128 in response to detecting that a definition, applied by the sensor to a detected event, results in a "true" value when applied. As an example, the definition may be "is the IP address in the range of 127.0.0.1 through 127.0.0.99", which in this example correspond to an IP address range used by a malware, such as a cryptominer. When the definition is applied, for example to a detected network packet, and the result is "true", the sensor is configured to send data pertaining to the event to the sensor backend server 128. Data pertaining to the event may be, for example, an IP address, an event type, combinations thereof, and the like.

In an embodiment, the sensor backend server 128 is configured to receive the data. In some embodiments, the sensor backend server 128 is further configured to apply a rule to the received data to determine if an inspection of the workload on which the sensor is deployed should be inspected for a cybersecurity threat. For example, the sensor backend server 128 is configured to generate an instruction to inspect a virtual machine 112, in response to receiving an indication from a sensor deployed as service on the virtual machine that a communication has been detected between the virtual machine 112 and a server having an IP address which is a forbidden IP address, such as an IP address associated with a malware.

For example, the sensor backend server 128 may generate an instruction for the inspection controller 122, which when executed by the inspection controller generates an inspectable disk, for example utilizing a snapshot, a copy, a clone, and the like of a disk (not shown) associated with the virtual machine 112, and provides access to an inspector 124 to the inspectable disk. In an embodiment the inspector 124 is configured to detect a cybersecurity threat. For example, the inspector 124 is configured to receive, in an embodiment, a hash of an application stored on the inspectable disk, and determine if the hash matches a hash of known malware applications. In certain embodiments, the inspector 124 is provided with a persistent volume claim (PVC) to the inspectable disk.

In some embodiments, the sensor is configured to generate a hash of an application on the resource, such as the virtual machine 112, on which it is deployed, and send the hash to the sensor backend server 128. The received hash may then be compared, for example by providing it to the inspector 124, with known hash values which correspond to malware applications.

While the examples above discuss malware and cryptominers, it is readily apparent that the sensor and inspector 124 may be utilized to detect other types of cybersecurity threats, such as an exposure, a vulnerability, a weak password, an exposed password, a misconfiguration, and the like.

In an embodiment, the inspection controller 122 is configured to allocate inspectors, such as inspector 124, initiate inspection for cybersecurity objects, provision inspectable disks, a combination thereof, and the like. In some embodiments, a cybersecurity object is a secret, a certificate, a software application, a software library, a software binary, an operating system, a code object, a hash of an object, a signature, a combination thereof, and the like.

In some embodiments, the inspection controller 122 is configured to inspect a workload to associate with an identity. For example, in an embodiment, an inspection controller 122 is configured to detect an identity from the IAM server 140, the identity associated with a permission.

In some embodiments, the inspection controller 122 is further configured to detect a secret associated with the identity. In certain embodiments, the inspection controller 122 is configured to detect a code object from an IaC platform 130 and detect an API call, a role assumption, an identity identifier, and the like, and associate the code object with the identity based on such a detection.

In certain embodiments, the inspection environment 120 further includes a security database 126. In some embodiments, the security database 126 is implemented as a graph database such as Neo4j®. In an embodiment, the security database 126 is configured to generate a representation of the cloud computing environment 110, such as cloud computing environment 110. For example, in an embodiment, the representation is based on a predefined unified data schema, so that each different cloud platform is represented using a unified data schema, allowing for a unified representation.

For example, according to an embodiment, a principal is represented by a predefined data structure, each principal represented by a node in the security graph. Likewise, a resource is represented by another predefined data structure, each resource represented by a node in the security graph, according to certain embodiments.

In certain embodiments, data received from a sensor deployed on a resource in the cloud computing environment may be stored in the graph database as part of the security graph. In the example above, in response to receiving data from the sensor which indicates a potential malware infection of the virtual machine 112, the sensor backend server 128 is configured, in an embodiment, to: generate a node representing the malware in the security database 126, generate a node in the security database 126 representing the virtual machine 112, and connect the node representing the malware with the node representing the virtual machine 112.

In some embodiments, the inspection environment includes a policy engine 125. In an embodiment, the policy engine 125 is configured to provide a sensor with a rule, a condition, a policy, and the like, which the sensor is configured to enforce on the workload.

Figure 2:
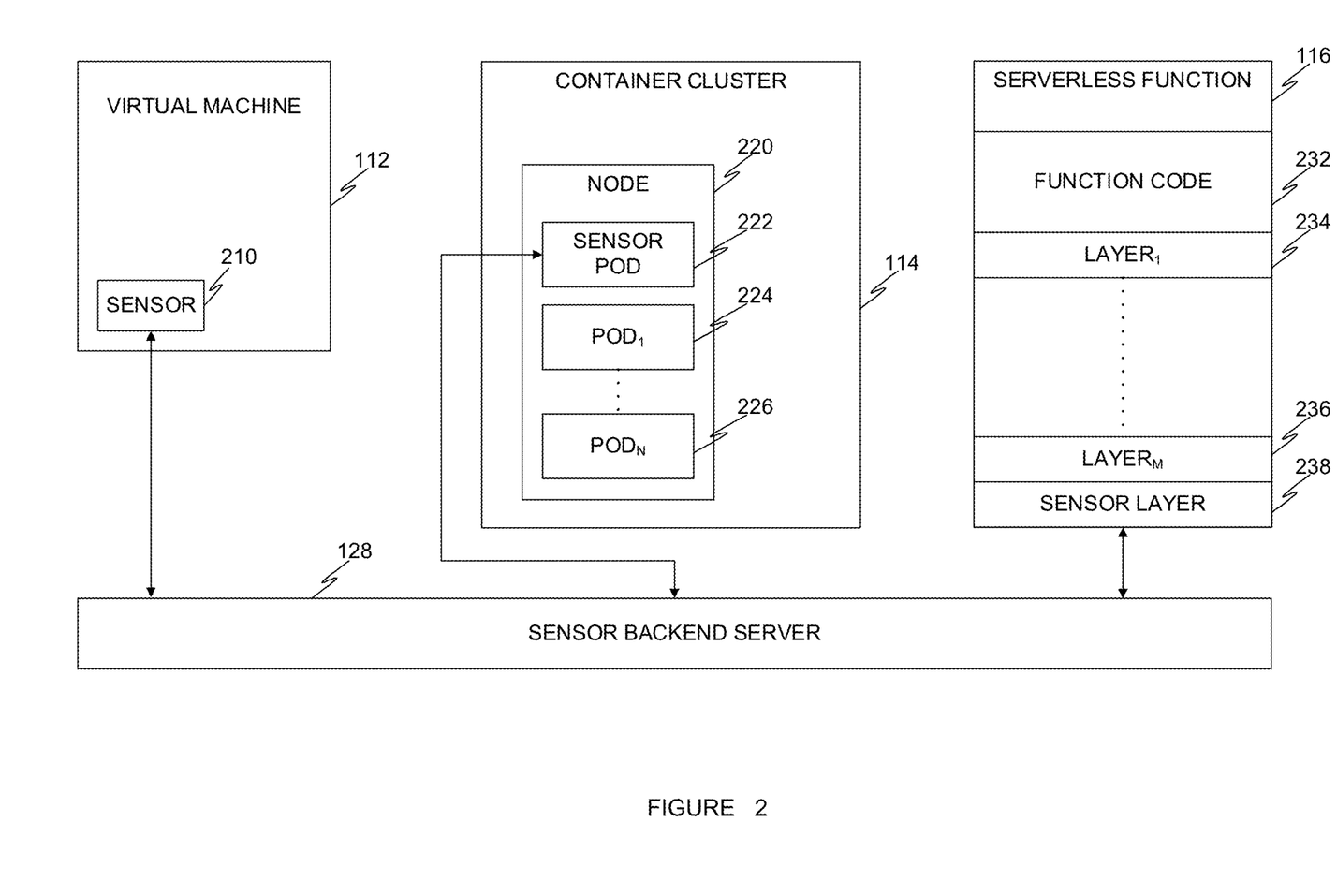
FIG. 2 is an example schematic illustration of a sensor backend server communicating with a plurality of sensors deployed on various workloads, implemented in accordance with an embodiment.

FIG. 2 is an example schematic illustration of a sensor backend server communicating with a plurality of sensors deployed on various workloads, implemented in accordance with an embodiment. In some embodiments, a sensor backend server 128 is configured to communicate with a machine (not shown) having a sensor installed thereon and communicatively coupled with the sensor backend server 128. In an embodiment, the machine is a bare metal machine, a computer device, a networked computer device, a laptop, a tablet, and the like computing devices.

In an embodiment, a sensor backend server 128 is implemented as a virtual machine, a software container, a serverless function, a combination thereof, and the like. In certain embodiments, a plurality of sensor backend servers 128 are implemented. In some embodiments where a plurality of sensor backend servers 128 are utilized, a first group of sensor backend servers of the plurality of sensor backend servers is configured to communicate with a sensor deployed on a first type of resource (e.g., virtual machine), a second group of sensor backend servers is configured to communicate with resources of a second type, etc.

In an embodiment, a first group of sensor backend servers is configured to communicate with sensors deployed on resources in a first cloud computing environment deployed on a first cloud platform (e.g., AWS) and a second group of sensor backend servers is configured to communicate with sensors deployed on resources in a second cloud computing environment deployed on a second cloud platform (e.g., GCP).

A virtual machine 112 includes a sensor 210. In an embodiment, the sensor 210 is deployed as a service executed on the virtual machine 112. In some embodiments, a virtual machine 112 is configured to request binary code, a software package, and the like, for example from a sensor backend sever 128, which when executed by the virtual machine 112 cause a sensor 210 to run as a service on the virtual machine 112. The sensor 210 is configured to listen to a data link layer communication, for example through an eBPF interface.

A container cluster 114 runs a daemonset, and includes a plurality of nodes, such as node 220. The daemonset ensures that each node 220 runs a daemonset pod 222, which is configured as a sensor. For example, a Kubernetes® cluster may execute a daemonset configured to deploy a daemonset pod on each deployed node, wherein the daemonset pod is configured to listen to a data link layer communication, for example through an eBPF interface, to communication of a plurality of pods, such as pod-1 224 through pod-N 226, where 'N' is an integer having a value of '1' or greater. The daemonset pod 222 is configured, in an embodiment, to communicate with the sensor backend server 128.

A serverless function 116 includes, in an embodiment, a function code 232, and a plurality of code layers 1 through M (labeled respectively as 234 through 236), where 'M' is an integer having a value of '1' or greater. For example, in AWS Lambda a layer contains, in an embodiment, code, content, a combination thereof, and the like. In some embodiments, a layer, such as layer 234 includes runtime data, configuration data, software libraries, and the like.

In certain embodiments, the serverless function 116 includes a sensor layer 238. The sensor layer 238 is configured, in an embodiment, to listen to a data link layer communication of the serverless function 116, for example through an eBPF interface.

The sensor service 210, daemonset pod 222, and sensor layer 238 are each an implementation of a sensor, according to an embodiment. In an embodiment, a sensor is configured to communicate with a sensor backend server 128 through a transport layer protocol, such as TCP. For example, the sensor backend server 128 is configured, in an embodiment, to listen to a predetermined port using a TCP protocol, and a sensor, such as sensor 210, daemonset pod 222, and sensor layer 238 are each configured to communicate with the backend sensor server 128, for example by initiating communication using TCP over the predetermined port.

Figure 3:
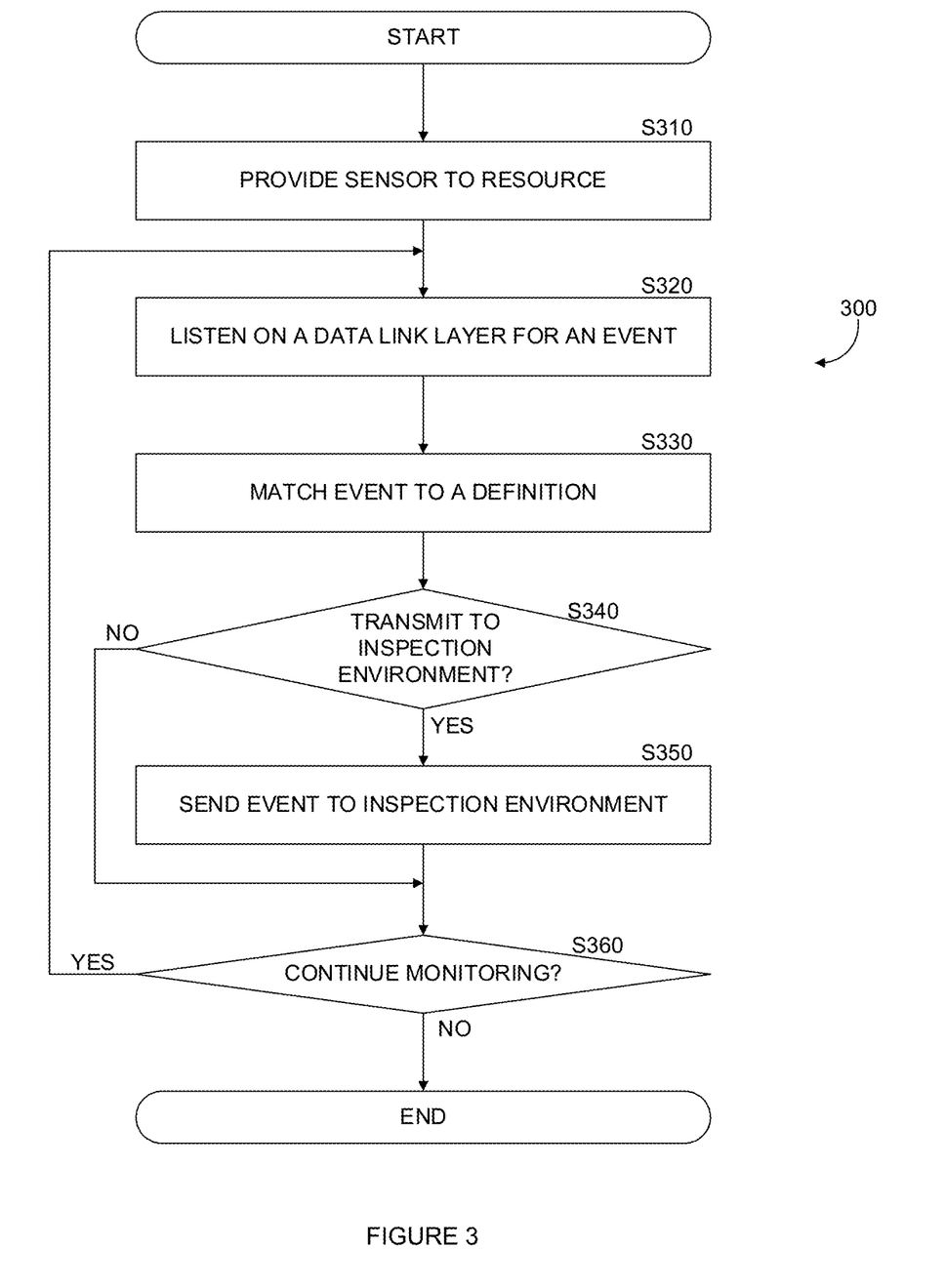
FIG. 3 is an example flowchart of a method for performing cybersecurity threat detection on a resource in a cloud computing environment, implemented in accordance with an embodiment.

FIG. 3 is an example flowchart 300 of a method for performing cybersecurity threat detection on a resource in a cloud computing environment, implemented in accordance with an embodiment.

At S310, a resource is provided with a sensor software. In an embodiment, the resource is any one of a virtual machine, a software container, a serverless function, and the like. In certain embodiments, the sensor software is provided based on the resource type. For example, a virtual machine is provided with a software package, such as an executable code, for example a binary code. A software container engine is provided with a daemonset, so that, in an embodiment where a node is deployed in a cluster of the software container engine, the node includes a daemonset pod which is configured to provide the functionality of a sensor, for example such as detailed above. In an embodiment, a serverless function is provided with a sensor layer by providing a code for example in a .ZIP file.

In an embodiment, providing a sensor includes configuring a resource, such as a virtual machine, software container, serverless function, and the like, to receive software which, when executed, configures the resource to deploy a sensor thereon.

At S320, an event is detected from a data link layer communication. In an embodiment, the data link layer is monitored through an eBPF interface for events. In certain embodiments, a software bill of materials (SBOM) is generated. An SBOM may be implemented as a text file, which is based off of events which were detected, for example through the eBPF interface. In an embodiment, an SBOM includes an identifier of a library which is accessed in runtime, an identifier of a binary which is accessed in runtime, an image of which an instance is deployed in runtime, a port which is accessed by a runtime program, a cryptographic hash function value (such as an SHA1, SHA2, and the like values), and the like. For example, an SBOM may include:

```
programs {
    exe_name: "/usr/sbin/rpc.mountd"
    last_seen: 1663138800
    exe_size: 133664
    exe_sha1:
        "200f06c12975399a4d7a32e171caabfb994f78b9"
    modules {
        path: "/usr/lib/libresolv-2.32.so"
        last_seen: 1663138800
    }
    modules {
        path: "/usr/lib/libpthread-2.32.so"
        last_seen: 1663138800
    }
    modules {
        path: "/usr/lib/ld-2.32.so"
        last_seen: 1663138800
    }
    modules {
        path: "/usr/lib/libc-2.32.so"
        last_seen: 1663138800
    }
    modules {
        path: "/usr/lib/libtirpc.so.3.0.0"
        last_seen: 1663138800
    }
    modules {
        path: "/usr/lib/libnss_files-2.32.so"
        last_seen: 1663138800
    }
    modules {
        path: "/usr/sbin/rpc.mountd"
        last_seen: 1663138800
    }
    listening_sockets {
        ip_addr: "0.0.0.0"
        port: 60311
    }
    listening_sockets {
        ip_addr: "0.0.0.0"
        port: 43639
    }
```

This portion of an SBOM indicates that a remote procedure call (RPC) is executed, which is configured to receive a client request to mount a file system.

At S330, the event is matched to a definition. In some embodiments, a definition includes a logical expression, which when applied to an event results in a "true" or "false" value. For example, a definition may state "software library xyz is accessed", with a result being either true or false, when applied to an event. In some embodiments, a rule is applied to an event. In an embodiment, a rule is a logical expression which further includes an action. For example, a rule states, in an embodiment, "IF software library xyz is accessed by UNKNOWN SOFTWARE, generate an alert". In this example, where an event is detected in which a software having an unknown identifier, for example which does not match a list of preapproved identifiers, attempts to access software library xyz, an alert is generated to indicate that such access is performed.

At S340, a check is performed to determine if data should be transmitted to an inspection environment. In some embodiments, the check is performed by applying a rule to an event, and determining transmission based on an output of applying the rule. If 'yes', execution continues at S350, if 'no' execution continues at S360.

At S350, data respective of an event is transmitted to an inspection environment. In an embodiment, the data is based on an SBOM file. In some embodiments, the data includes event data, such as an identifier of a resource (e.g., virtual machine, software container, serverless function, etc.), an identifier of an application, a hash value, a uniform resource locator (URL) request, a software library identifier, a software binary file identifier, a timestamp, and the like.

At S360, a check is performed to determine if monitoring of the resource should continue. For example, a daemonset of a container may be configured to periodically deploy a daemonset pod to monitor pods in a node. As another example, a virtual machine may be configured to periodically deploy a sensor service which runs as a process on the virtual machine, terminate the process after a predetermined period of time, terminate the process after a predetermined number of detected events, and the like.

In some embodiments, the check is performed based on a predetermined amount of elapsed time (e.g., every four hours, every day, twice a day, etc.). If 'yes', execution continues at S320. If 'no', in an embodiment execution terminates. In some embodiments, if 'no', another check is performed at S360, for example after a predetermined period of time has lapsed.

Figure 4:
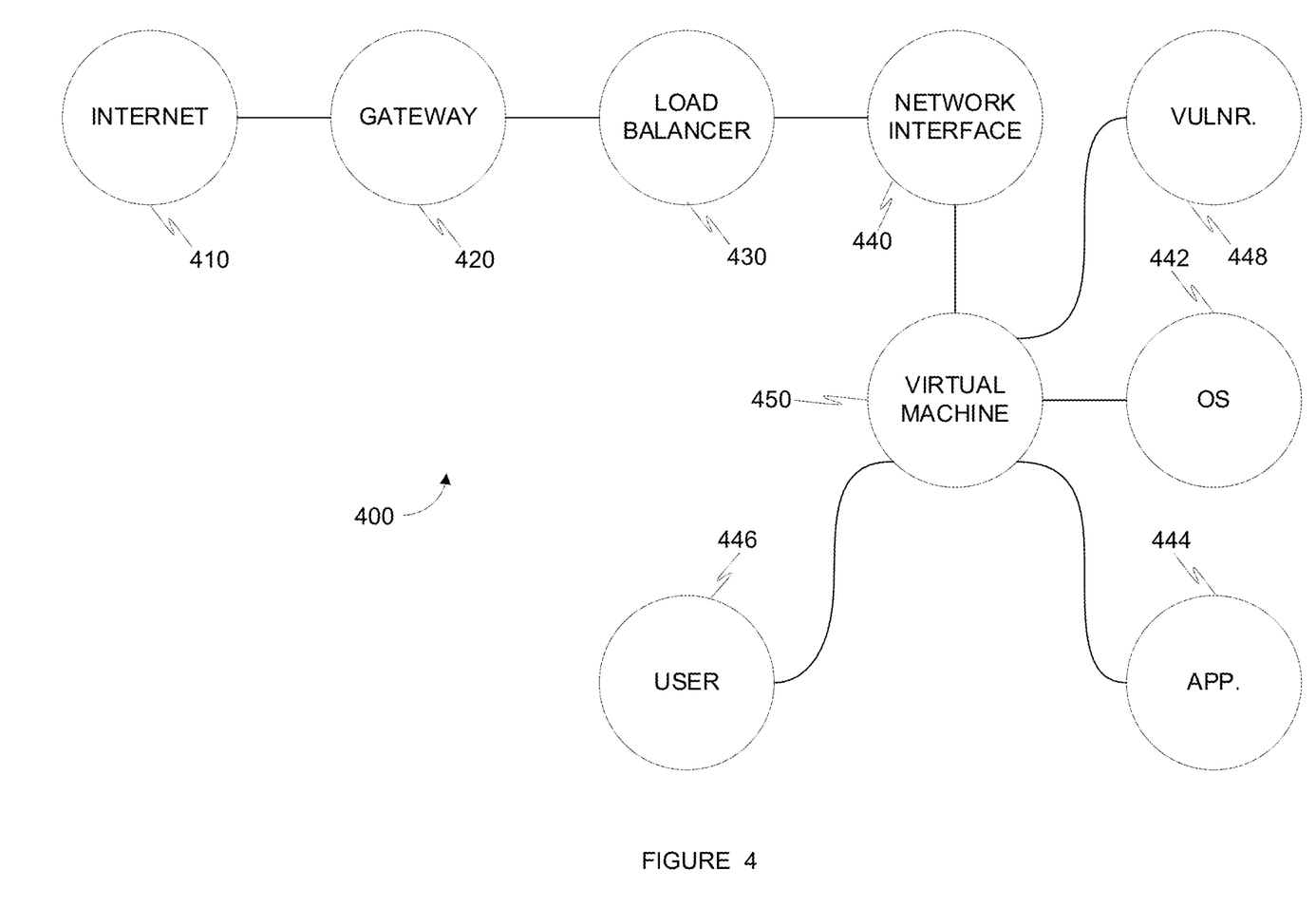
FIG. 4 is a security graph portion, implemented in accordance with an embodiment.

FIG. 4 is an example of a security graph 400 portion, implemented in accordance with an embodiment. In an embodiment, a security graph 400 represents a computing environment, such as the cloud computing environment 110 of FIG. 1 above, in a graph database, according to a predefined data schema. In some embodiments, a cloud computing environment is represented in a graph database by mapping resources, principals, enrichments, and the like, to nodes in the security graph 400 and generating connections between the generated nodes. For example, in an embodiment, a resource node 420 represents a resource, such as a workload (e.g., a virtual machine, a software container, a serverless function, an application, and the like). In some embodiments, a principal node 446 represents a user account, a service account, a role, and the like. In an embodiment, an enrichment node represents an endpoint, for example having access to a public network (e.g., the Internet), a vulnerability, other attributes of a workload, and the like.

In an embodiment, an enrichment node 410 represents internet access, such that any node which is connected (e.g., by an edge) to the enrichment node 410, represents a resource which is capable of accessing the internet. In an embodiment, a resource node 420 represents a gateway workload, which is implemented, for example, as a node in a software container cluster. In certain embodiments, a second resource node 430 represents a load balancer workload, which is connected by an edge to the resource node 420 representing the gateway, and to a network interface node 440, which represents a network interface.

In an embodiment, the network interface node 440 is connected to a resource node 450 which represents a virtual machine, such as the virtual machine 112 of FIG. 1. In an embodiment, the virtual machine 112 includes, for example, an operating system (OS) represented by OS node 442, an application which is executed on the OS of the virtual machine 112, represented by application node 444, a user account node 446 which represents a user account, the user account having access to the virtual machine 112, and a vulnerability node 448, which represents a vulnerability which was detected as being present on, or pertaining to, the virtual machine 112.

For example, in an embodiment, an inspector is configured to inspect a disk of the virtual machine 112 for a cybersecurity threat, such as a vulnerability. In response to detecting the vulnerability, the inspector is configured to generate a node representing the vulnerability in the security graph 400, and generating a connection between the node representing the vulnerability (i.e., vulnerability node 448) and the resource node 450 which represents the virtual machine, according to an embodiment. A vulnerability is, in an embodiment, an outdated software, a specific open port, a user account with excessive permissions, a combination thereof, and the like.

Generating a node representing a vulnerability allows for a compact representation of the computing environment. Rather than store, for each node, data which describes the same vulnerability, that data is stored as a single node, and each node representing a resource which has the same vulnerability is connected to the vulnerability node. Thus, redundant information is not stored, allowing less storage space utilized, resulting in a compact representation without loss of information.

Figure 5:
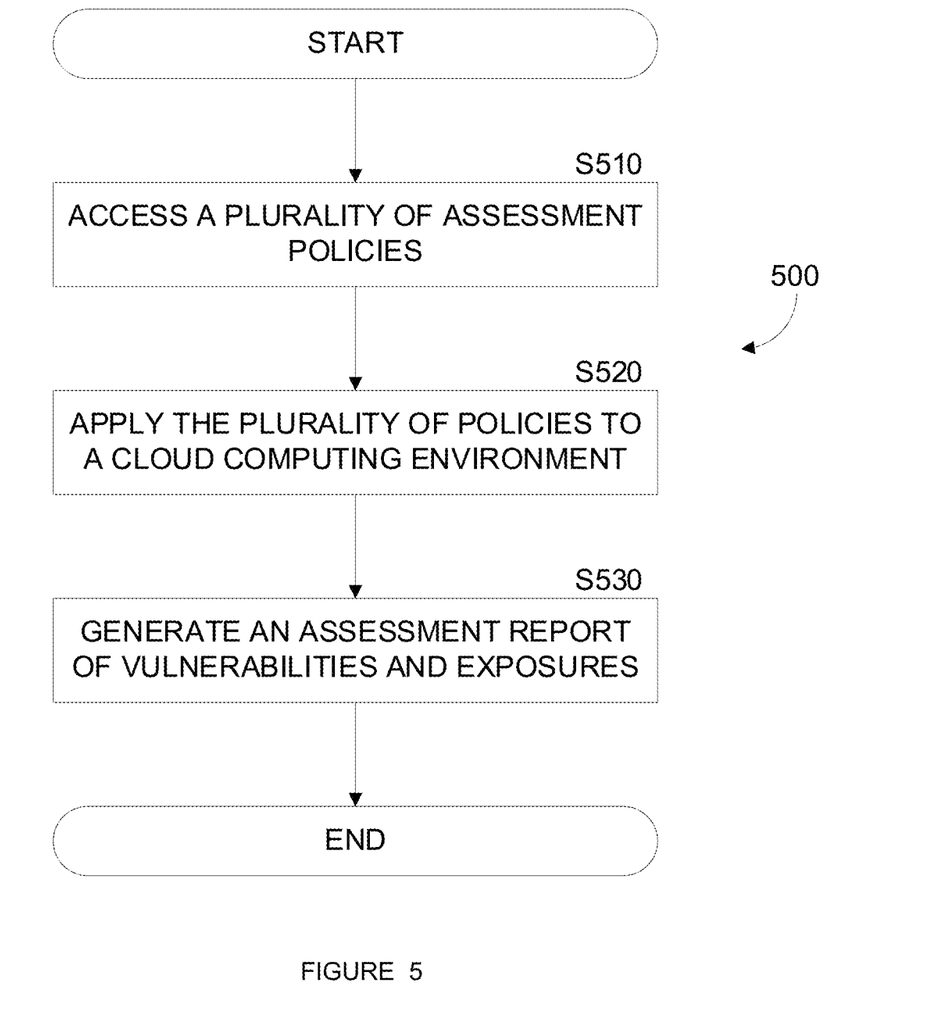
FIG. 5 is a flowchart of a method for performing a risk assessment for a cloud environment, implemented in accordance with an embodiment.

FIG. 5 is a flowchart 500 of a method for determining contextual risk for a cloud computing environment and initiating mitigation thereof, implemented in accordance with an embodiment.

At S510, an assessment policy is accessed. In an embodiment, a plurality of assessment policies are accessed. In some embodiments, the plurality of assessment policies are stored in a policy engine, and accessed by an assessment manager. In certain embodiments, each assessment policy further includes a query which is executable on a security graph. According to an embodiment, the query is executed in order to generate a result, in which a cloud entity is detected which is in violation of the policy associated with the query.

In some embodiments, accessing an assessment policy includes accessing a policy engine to extract a policy for a cloud computing environment. In certain embodiments, the policy includes a conditional rule, based on which a query is generated. For example, in an embodiment the conditional rule includes a cloud entity type value (e.g., a workload), and a query is generated which when executed on a security graph returns an identifier of a cloud entity, based on detecting a node representing the cloud entity based on the value of the cloud entity type.

In an embodiment, a cloud entity is, for example, a workload type (e.g., a virtual machine, a software container, a serverless function, etc.), an application type (e.g., a gateway, a load balancer, etc.), a principal (e.g., a user account, a service account, etc.), an enrichment, a vulnerability, and the like.

At S520, a policy is applied on a cloud computing environment. In some embodiments, a plurality of polices are applied to a cloud computing environment. In an embodiment, the plurality of policies are applied periodically, at predetermined times, in response to a user generated request, a combination thereof, and the like. In certain embodiments, a policy, a plurality of policies, and the like, are applied on a plurality of cloud computing environments. In an embodiment, a first cloud computing environment is deployed on a first cloud computing infrastructure (e.g., AWS) and a second cloud computing environment is deployed on a second cloud computing infrastructure (e.g., GCP). By applying a policy on a representation of the cloud computing environments in a security graph, the same policy can be equally applied to each cloud computing environment, without having to maintain a similar policy for each cloud computing environment separately.

In certain embodiments, applying a policy includes querying a security graph based on a query associated with the policy. The query generates an output that can include, in an embodiment, additional nodes which are connected to the node that is returned from the query. In the example above, a traversing the graph to detect a vulnerability node returns a node which corresponds to a workload having the vulnerability, in accordance with an embodiment.

In certain embodiments, the query includes, for example, public exposure detection, vulnerability detection, database exposure, code vulnerability, endpoint detection, malware detection, misconfiguration detection, a lateral movement detection, an exposed secret, a combination thereof, and the like. In some embodiments, malware detection includes querying a security graph to determine if a workload is indicated as having malware.

For example, in an embodiment, a malware object is represented as a node in the security graph. In an embodiment, the malware object is detected, for example by an inspector which is configured to inspect the workload for the malware object, for example by detecting a signature of the malware object.

Thus, if a node representing the workload is connected in the security graph to the node representing the malware object, the workload is considered to have the malware object on it, according to an embodiment. In an embodiment, detecting a misconfiguration includes, for example, querying the security graph to determine if a database application is installed on a workload, which is not password protected. A password is represented, in an embodiment, as an attribute of a node representing the database, as a node of its own in the security graph, and the like. Where a workload node is detected which is connected to a database application node (i.e., a node which represents a database application), which in turn does not have a password attribute, is not connected to a password node, and the like, the output of such a query is that the workload node represents a misconfigured workload, in accordance with an embodiment.

At S530, a risk assessment report is generated. In an embodiment, the risk assessment report includes an output generated in response to querying the security graph. For example, in an embodiment the output includes an identifier of a workload deployed in the cloud environment, which is represented by a node in the security graph, the node having an attribute which satisfies a condition of the query.

In certain embodiments, the risk assessment report further includes a risk mitigation suggestion. In an embodiment, a risk mitigation suggestion is received from an external database, such as CVE®. In an embodiment, the risk mitigation suggestion includes instructions that when executed, initiate a mitigation action.

In some embodiments, the risk assessment report includes a first cybersecurity risk detected in a first cloud computing environment and in a second cloud computing environment. In certain embodiments, the risk assessment report includes a first cybersecurity risk detected in a first cloud computing environment, and a second cybersecurity risk detected in a second cloud computing environment.

At S540, a mitigation action is initiated. For example, in an embodiment, a mitigation action includes an instruction to install a software patch to overcome a known vulnerability, an instruction to revoke access to a network, an instruction to revoke access to a resource, an instruction to modify a permission of a principal, a combination thereof, and the like. In an embodiment the mitigation action is initiated in response to generating the risk assessment report. In certain embodiments, the risk assessment report includes a plurality of cybersecurity risks, ordered by a value of a severity index. In such embodiments, a plurality of mitigation actions are initiated, such that a first mitigation action is initiated before a second mitigation action, wherein the first mitigation action is initiated in response to a first cybersecurity risk having a severity index value which is higher than a second cybersecurity risk having a second severity index value, which corresponds to the second mitigation action.

In an embodiment, by initiating mitigation actions based on an order of severity, compute resources of a cloud computing environment are better utilized, by first addressing the most critical cybersecurity risks.

In some embodiments, a plurality of mitigations actions are initiated such that a first mitigation action is initiated in a first cloud computing environment, and a second mitigation action is initiated in a second cloud computing environment.

Figure 6:
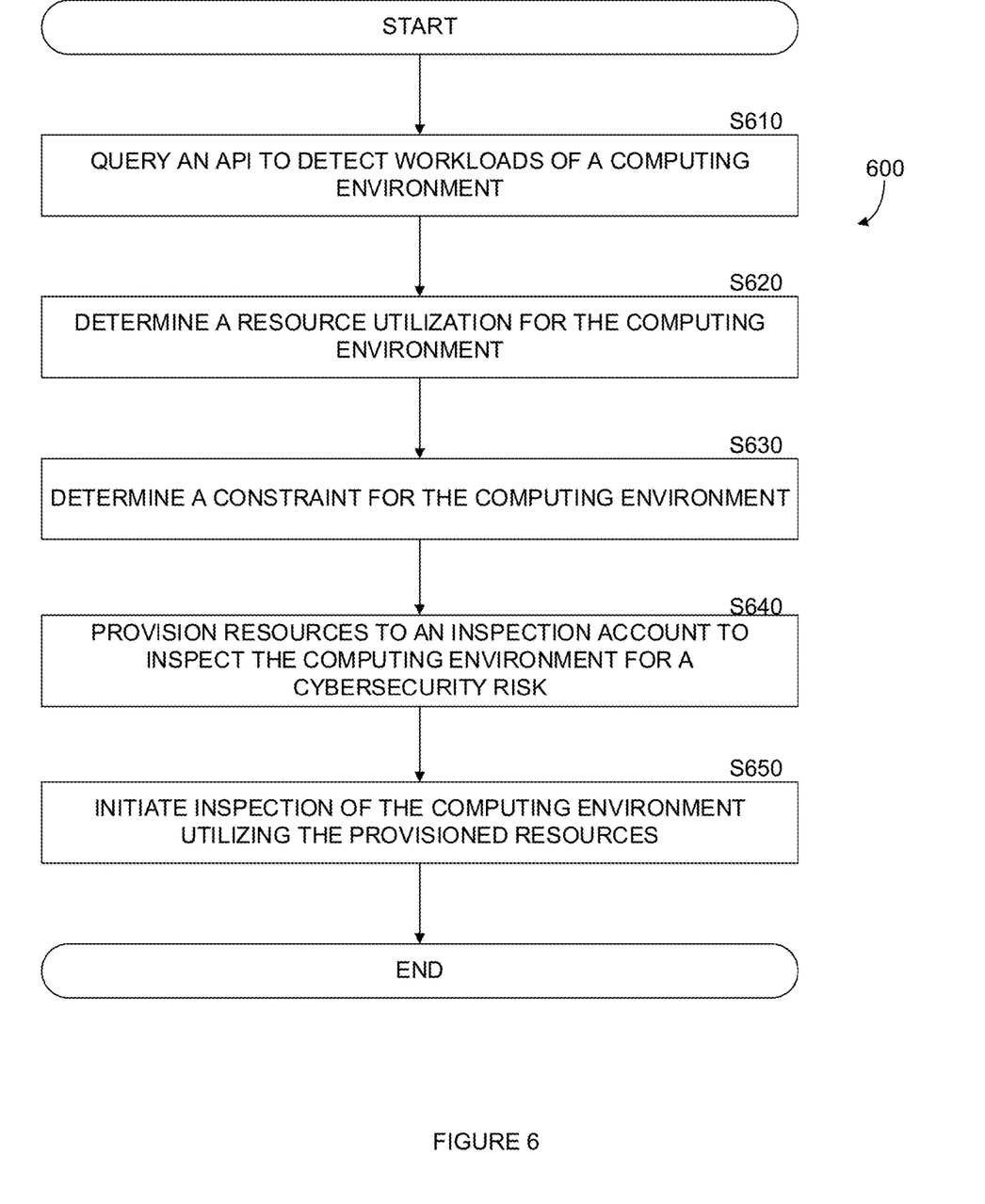
FIG. 6 is an example flowchart of a method for risk and constraint-based inspection of a computing environment, implemented in accordance with an embodiment.

FIG. 6 is an example flowchart 600 of a method for risk and constraint-based inspection of a computing environment, implemented in accordance with an embodiment. In an embodiment, the computing environment is a cloud based computing environment, a Kubernetes® software container cluster, an on-prem computing environment, and the like.

At S610, an application programming interface (API) is queried to detect workloads. In an embodiment, an API of a cloud computing environment is queried to detect a plurality of workloads deployed in the cloud computing environment. In some embodiments, detecting a workload includes receiving an identifier of a resource, such as a virtual machine, a software container, a serverless function, a virtual appliance, a combination thereof, and the like.

In an embodiment, the API is a control plane of a cloud computing environment. In some embodiments, the cloud computing environment is implemented as a virtual private cloud (VPC), a virtual network (VNet), a virtual private network (VPN), a combination thereof, and the like. In an embodiment, the cloud computing environment is deployed on a cloud computing infrastructure, such as provided by Amazon® Web Service (AWS), Google® Cloud Platform (GCP), Microsoft Azure, and the like.

In some embodiments, a plurality of cloud computing environments, computing environments, hybrid environments, and the like, are each queried to detect workloads deployed therein. In certain embodiments, network discovery techniques are further employed to discover workloads deployed in a particular computing environment.

In an embodiment, a control plane is inspected to detect workloads deployed in a computing environment. In some embodiments, a data plane is inspected to detect additional workloads, relationships between workloads, etc.

At S620, a resource utilization is determined for each workload. In some embodiments, a resource utilization is determined for each workload of a plurality of associated workloads, such as each virtual machine in an auto-scaling group. In an embodiment, resource utilization includes processor usage, memory usage, storage usage, a combination thereof, and the like.

According to an embodiment, resource utilization is determined over time, for a period of time, for a maximum (i.e., peak usage), for a minimum (i.e., minimal usage), a combination thereof, and the like.

In an embodiment, resource utilization includes actual resources consumed by a workload while the workload is deployed in a state of operation in a computing environment, such as a cloud computing environment.

Optionally, a resource utilization of an inspector workload is determined. In an embodiment, an inspector workload is a workload which is configured to scan, inspect, and the like, a workload, a copy of a workload, a clone of a disk of a workload, and the like, of an existing workload deployed in a computing environment.

In some embodiments, the inspector workload includes an inspector configured to perform static analysis. In certain embodiments, the inspector workload is a process deployed on a workload (e.g., a virtual machine) which itself is deployed in a computing environment. In certain embodiments, a plurality of inspector workloads are deployed, each utilizing different resources.

At S630, a constraint is determined. In an embodiment, the constraint is a risk-based constraint. In some embodiments, a risk-based constraint is determined based on a result of a previous inspection. For example, in an embodiment, a previous inspection detects a resource (i.e., workload) which includes a vulnerability. In an embodiment, a rate of inspection of the resource increases, and additional resources are provisioned to allow provisioning of inspector workloads, for example, in order to meet the demand of increased inspection requirements.

In an embodiment, a constraint is based on a region of a computing environment. For example, in an embodiment, the constraint includes deploying inspector workloads in a computing environment being inspected, for a region of a first type, and deploying inspector workloads in an inspection environment having access to the computing environment, for a region of a second type.

According to some embodiments, a constraint is determined based on the resource type. For example, in an embodiment, software containers are inspected at a first frequency, and virtual machines are inspected at a second frequency. In some embodiments, a type of resource includes, for example, a type of virtual machine (e.g., t2.micro). In an embodiment, the constraint is based on a cybersecurity object. For example, a known OS disk (i.e., disk which is used to store an operating system) is inspected with a frequency which is lower than a frequency of inspection of a data disk.

In some embodiments, the constraint is determined based on a privacy requirement, a compliance requirement, a resource consumption rate, a resource cost (e.g., cost of CPU, cost of memory, etc.), a combination thereof, and the like.

In an embodiment, the constraint is determined based on a type of resource which is inspected. For example, in an embodiment, a database is inspected only in the region in which it is deployed. Data itself is inspected in the computing environment, and not in an inspection environment, which reduces transfer of the data, metadata, etc., between the computing environment and the inspection environment, which adds security to the inspection process, according to an embodiment.

At S640, resources are provisioned to an inspection account. In some embodiments, resources of the cloud computing environment are provisioned to an inspection account based on the determined resource utilization of the inspector workload. For example, in an embodiment, a first amount of resources, type of resources, etc., are provisioned to an inspection account in a computing environment, which are utilized by the inspection environment to deploy an inspector workload and initiate inspection of workloads.

In some embodiments, resources are provisioned to the inspection account based on a result of a previous inspection. For example, where a cybersecurity risk, misconfiguration, vulnerability, exposure, etc., are detected, the inspection account is allocated additional resources for a next inspection cycle. In certain embodiments, where less cybersecurity risks are detected, the inspection account is provisioned proportionally less resources for initiating inspection at a next inspection cycle.

In certain embodiments, inspection resources are further provisioned based on network bandwidth consumption regulation, processor regulation, memory regulation, a combination thereof, and the like.

In some embodiments, inspection resources are provisioned dynamically, statically, or adaptively. In an embodiment, dynamic provision differs for example based on a time period, adaptive provisioning allows for provisioning based on detections, while static provisioning allows for constant provisioning.

In an embodiment, inspection includes static analysis performed by an inspector workload, code inspection, registry inspection, bucket inspection, and the like.

At S650, an inspection of the workloads are initiated. In certain embodiments, inspection of the workloads are initiated utilizing the provisioned resources. In an embodiment, an inspection controller is configured to initialize inspection, for example by allocating inspector workloads to perform static analysis of workloads, disks associated with workloads, etc. According to an embodiment, inspection is initiated based on the constraint. In some embodiments, the constraint is a risk-based constraint, a resource-based constraint, a compliance-based constraint, a region-based constraint, a combination thereof, and the like.

In an embodiment, a mitigation action is initiated as a result of inspection. For example, in certain embodiments, a mitigation action is initiated in response to detecting a cybersecurity object based on the inspection. In some embodiments, the mitigation action includes generating a new constraint for a next cycle of inspection. According to an embodiment, a mitigation action includes generating a notification, generating an alert, generating an alert severity, revoking access to a resource, revoking access from a resource, revoking access from a principal, revoking access to a principal, a combination thereof, and the like.

Figure 7:
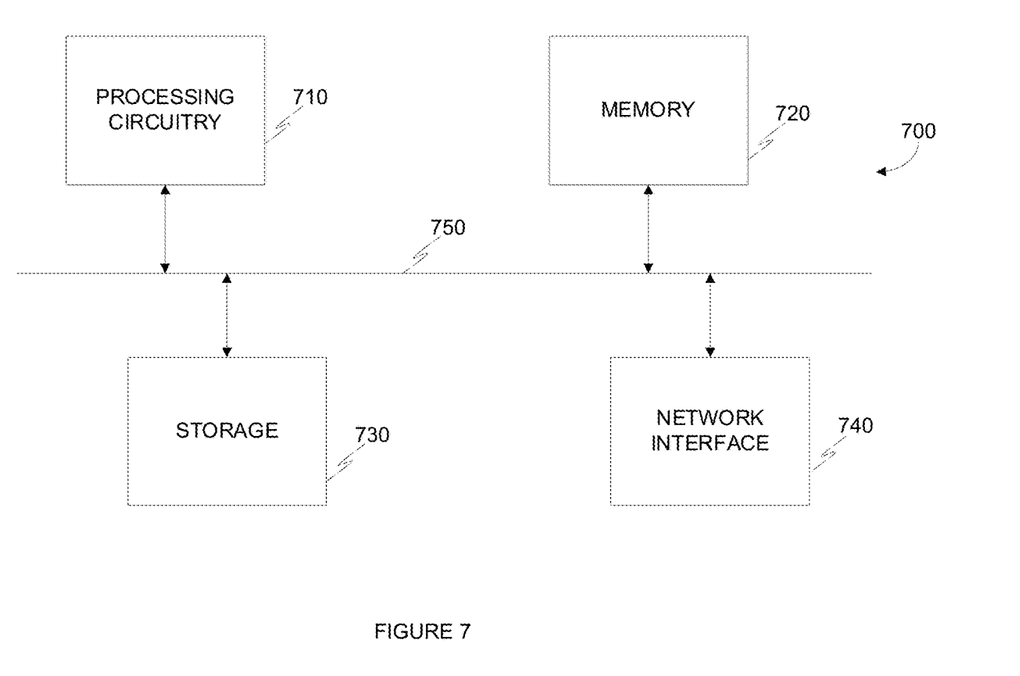
FIG. 7 is an example schematic diagram of an inspection controller according to an embodiment.

FIG. 7 is an example schematic diagram 700 of an inspection controller 122 according to an embodiment. The inspection controller 122 includes, according to an embodiment, a processing circuitry 710 coupled to a memory 720, a storage 730, and a network interface 740. In an embodiment, the components of the inspection controller 122 are communicatively connected via a bus 750.

In certain embodiments, the processing circuitry 710 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 720 is a volatile memory (e.g., random access memory, etc.), a non-volatile memory (e.g., read only memory, flash memory, etc.), a combination thereof, and the like. In some embodiments, the memory 720 is an on-chip memory, an off-chip memory, a combination thereof, and the like. In certain embodiments, the memory 720 is a scratch-pad memory for the processing circuitry 710.

In one configuration, software for implementing one or more embodiments disclosed herein is stored in the storage 730, in the memory 720, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 710, cause the processing circuitry 710 to perform the various processes described herein, in accordance with an embodiment.

In some embodiments, the storage 730 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 740 is configured to provide the inspection controller 122 with communication with, for example, the computing environment 110, according to an embodiment.

It should be understood that the embodiments described herein are not limited to the specific architecture illustrated in FIG. 7, and other architectures may be equally used without departing from the scope of the disclosed embodiments.

Furthermore, in certain embodiments the inspector 124, the policy engine 125, the sensor backend 128, the security database 126, a combination thereof, and the like, may be implemented with the architecture illustrated in FIG. 7. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for risk and constraint-based cybersecurity inspection of a computing environment, comprising:
   querying an application programming interface (API) of a computing environment to detect a plurality of workloads deployed therein;
   determining a constraint for inspection of the computing environment;
   provisioning resources of the computing environment to an inspection account based on the determined constraint, wherein the inspection account is a principal authorized to initiate actions in the computing environment; and
   initiating inspection of the plurality of workloads utilizing the provisioned resources.

2. The method of claim 1, further comprising:
detecting a cybersecurity risk in the computing environment; and
adjusting the provisioned resources based on the detected cybersecurity risk.

3. The method of claim 2, wherein detecting a cybersecurity risk further comprises:
inspecting a workload of the plurality of workloads for a cybersecurity object; and
detecting the cybersecurity object on the workload, wherein the cybersecurity object indicates a cybersecurity risk.

4. The method of claim 1, further comprising:
initiating inspection of a cloud entity of a control plane of the computing environment.

5. The method of claim 1, further comprising:
initiating inspection of a cloud entity of a data plane of the computing environment.

6. The method of claim 1, wherein determining a constraint further comprises:
determining for each workload of the plurality of workloads a resource utilization; and
determining a resource utilization of an inspector workload.

7. The method of claim 1, further comprising:
detecting a cybersecurity object on a first workload of the plurality of workloads, the cybersecurity object indicating a cybersecurity issue;
selecting a periodic time for inspection based on the cybersecurity issue, wherein the periodic time is the determined constraint; and
initiating inspection of the first workload periodically based on the selected periodic time.

8. The method of claim 1, further comprising:
provisioning, based at least on the determined constraint, a network bandwidth between the computing environment and an inspection environment.

9. The method of claim 8, further comprising:
receiving a result of the initiating inspection from an inspector workload; and
generating a representation based on the result in a security database, wherein the security database includes a representation of the computing environment.

10. The method of claim 1, further comprising:
detecting a code object utilized to deploy a first workload of the plurality of workloads in the computing environment; and
determining a resource utilization of the first workload based on a static analysis of the code object.

11. The method of claim 1, further comprising:
deprovisioning a resource provisioned to the inspection account in response to determining that the resource is not utilized during inspection.

12. The method of claim 1, further comprising:
receiving a resource constraint, the resource constraint indicating a limit on resource utilization of the computing environment; and
provisioning resources for inspection further based on the received resource constraint.

13. A non-transitory computer-readable medium storing a set of instructions for risk and constraint-based cybersecurity inspection of a computing environment, the set of instructions comprising:
one or more instructions that, when executed by one or more processing circuitries of a device, cause the device to:
query an application programming interface (API) of a computing environment to detect a plurality of workloads deployed therein;
determine a constraint for inspection of the computing environment;
provision resources of the computing environment to an inspection account based on the determined constraint, wherein the inspection account is a principal authorized to initiate actions in the computing environment; and
initiate inspection of the plurality of workloads utilizing the provisioned resources.

14. A system for risk and constraint-based cybersecurity inspection of a computing environment comprising:
one or more processing circuitries configured to:
query an application programming interface (API) of a computing environment to detect a plurality of workloads deployed therein;
determine a constraint for inspection of the computing environment;
provision resources of the computing environment to an inspection account based on the determined constraint, wherein the inspection account is a principal authorized to initiate actions in the computing environment; and
initiate inspection of the plurality of workloads utilizing the provisioned resources.

15. The system of claim 14, wherein the one or more processing circuitries are further configured to:
detect a cybersecurity risk in the computing environment; and
adjust the provisioned resources based on the detected cybersecurity risk.

16. The system of claim 15, wherein the one or more processing circuitries, when detecting a cybersecurity risk, are configured to:
inspect a workload of the plurality of workloads for a cybersecurity object; and
detect the cybersecurity object on the workload, wherein the cybersecurity object indicates a cybersecurity risk.

17. The system of claim 14, wherein the one or more processing circuitries are further configured to:
initiate inspection of a cloud entity of a control plane of the computing environment.

18. The system of claim 14, wherein the one or more processing circuitries are further configured to:
initiate inspection of a cloud entity of a data plane of the computing environment.

19. The system of claim 14, wherein the one or more processing circuitries, when determining a constraint, are configured to:
determine for each workload of the plurality of workloads a resource utilization; and
determine a resource utilization of an inspector workload.

20. The system of claim 14, wherein the one or more processing circuitries are further configured to:
detect a cybersecurity object on a first workload of the plurality of workloads, the cybersecurity object indicating a cybersecurity issue;
select a periodic time for inspection based on the cybersecurity issue, wherein the periodic time is the determined constraint; and
initiate inspection of the first workload periodically based on the selected periodic time.

21. The system of claim 14, wherein the one or more processing circuitries are further configured to:
provision, based at least on the determined constraint, a network bandwidth between the computing environment and an inspection environment.

22. The system of claim 21, wherein the one or more processing circuitries are further configured to:
receive a result of the initiating inspection from an inspector workload; and
generate a representation based on the result in a security database, wherein the security database includes a representation of the computing environment.

23. The system of claim 14, wherein the one or more processing circuitries are further configured to:
detect a code object utilized to deploy a first workload of the plurality of workloads in the computing environment; and
determine a resource utilization of the first workload based on a static analysis of the code object.

24. The system of claim 14, wherein the one or more processing circuitries are further configured to:
deprovision a resource provisioned to the inspection account in response to determining that the resource is not utilized during inspection.

25. The system of claim 14, wherein the one or more processing circuitries are further configured to:
receive a resource constraint, the resource constraint indicating a limit on resource utilization of the computing environment; and
provision resources for inspection further based on the received resource constraint.

\* \* \* \* \*